W. B. SEWELL.
WING FOR WINDSHIELDS.
APPLICATION FILED NOV. 3, 1919.
1,416,422.                                  Patented May 16, 1922.
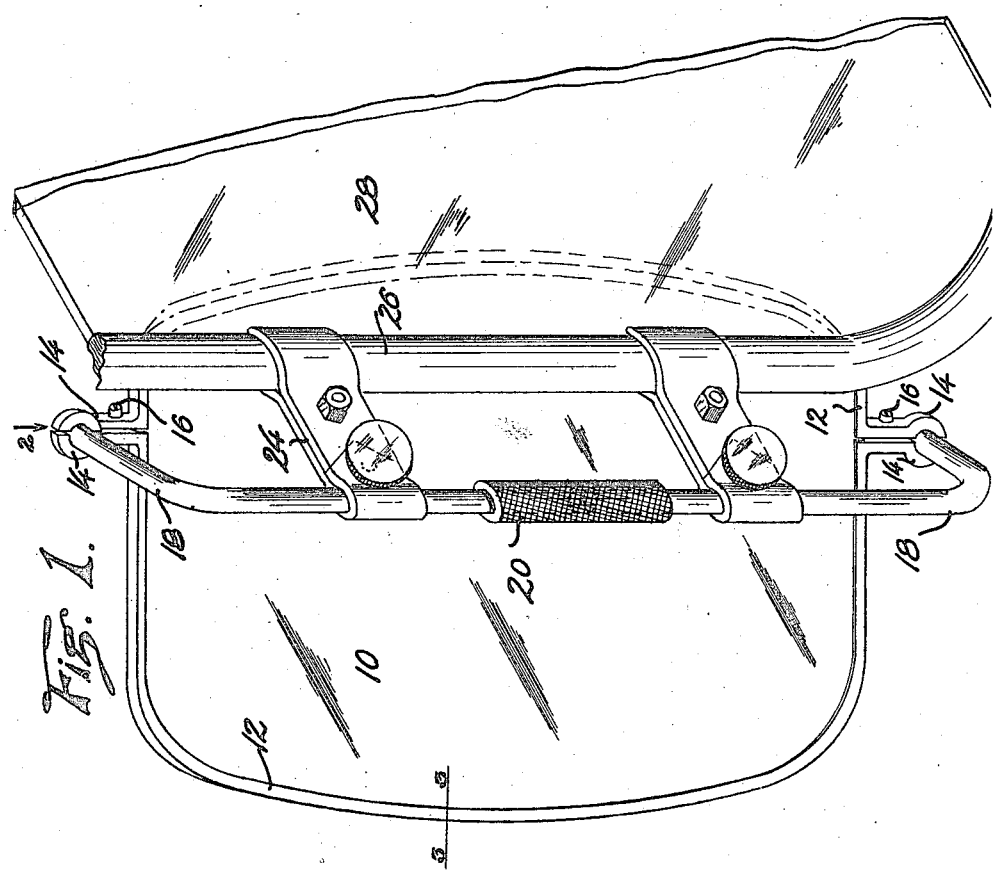
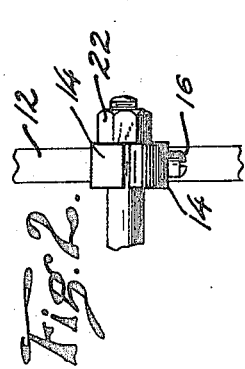
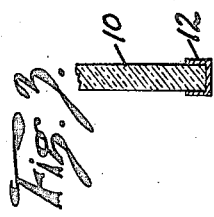
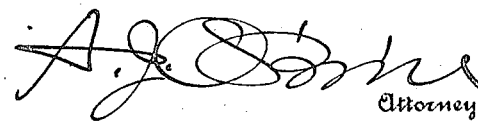
William B. Sewell. Inventor

UNITED STATES PATENT OFFICE.

WILLIAM B. SEWELL, OF DENVER, COLORADO, ASSIGNOR, BY MESNE ASSIGNMENTS, TO THE SEWELL-HUNT MANUFACTURING COMPANY, INCORPORATED, OF DENVER, COLORADO, A CORPORATION OF COLORADO.

WING FOR WINDSHIELDS.

1,416,422.  Specification of Letters Patent.  Patented May 16, 1922.

Application filed November 3, 1919. Serial No. 335,245.

*To all whom it may concern:*

Be it known that I, WILLIAM B. SEWELL, a citizen of the United States, residing at the city and county of Denver and State of Colorado, have invented certain new and useful Improvements in Wings for Windshields; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to wing devices to be attached to windshields of automobiles, and the object is to deflect the wind.

Briefly, the invention comprises a wing member proper, composed of plate glass whose edges are bound with a pair of rim members. The ends of the rim members are provided with offset cooperating clamps in order to mount the plate upon the supporting rod adapted to be connected to a windshield.

In the drawings forming part of the specification,

Fig. 1 is a perspective, showing the device in use.

Fig. 2 is an enlarged detail, looking in the direction of the arrow 2 of Fig. 1; and Fig. 3 is a fragmentary section on an enlarged scale, taken on the line 3—3 of Fig. 1.

The body of the wing is composed of a plate glass member 10, having rim members 12, positioned around its edges, both members 12 being generally U-shaped in cross section, as indicated in Fig. 3, in order that they may firmly retain the glass. At the end of each rim member 12 an offset, vertically disposed clamping jaw 14 is provided, each pair of opposing jaws being adapted to be drawn together by means of a binding screw 16 in order to clamp between the jaw members 14 the laterally bent ends of a supporting rod 18, which is composed of two members adjustably connected by a turnbuckle 20. A nut 22 is threaded upon the outer ends of the supporting rod portions 18 in order to positively retain the relation with respect to the clamps 14.

In order to mount the fixture upon a windshield, a clamp 24 is provided, this clamp being adapted to engage both the rod member 18 and the post 26 of the windshield 28.

I claim:

1. A windshield wing comprising a transparent plate, a pair of rim members bound about the edges of said plate to retain the same, offset cooperating clamps carried by the opposite ends of said rim members, means to bind said clamps together, and a supporting rod device having its ends held in said clamps, said device being adapted to be secured to a windshield.

2. A windshield comprising a transparent plate, a pair of rim members bound about the edges of said plate to retain the same, offset cooperating clamps carried by the opposite ends of said rim members, means to bind said clamps together, a two part supporting rod device having its ends held in said clamps, and a turnbuckle joining the two parts of said rod.

In testimony whereof I affix my signature.

WILLIAM B. SEWELL.